United States Patent
Schaaf et al.

(12) 
(10) Patent No.: US 6,209,892 B1
(45) Date of Patent: Apr. 3, 2001

(54) BABY STROLLER APPARATUS FOR USE IN COMBINATION WITH A STANDARD CHILD'S CAR SEAT

(76) Inventors: William Chester Schaaf; Marshajene Schaaf, both of 19041 Durrance Rd., North Fort Myers, FL (US) 33917

( * ) Notice: Subject to any disclaimer, the term of this patent is extended or adjusted under 35 U.S.C. 154(b) by 0 days.

(21) Appl. No.: 09/460,963

(22) Filed: Dec. 14, 1999

(51) Int. Cl.[7] .................................................. B62D 39/00
(52) U.S. Cl. .................... 280/33.993; 280/642; 280/647; 280/47.38; 297/130
(58) Field of Search .................................. 280/647, 648, 280/642, 650, 657, 658, 33.998, 47.34, 47.35, 47.38, 47.4, 79.2, 30, 33.991, 33.993; 297/130, 250.1, 256.16

(56) References Cited

U.S. PATENT DOCUMENTS

| | | | |
|---|---|---|---|
| 3,829,113 | * | 8/1974 | Epelbaum ............................ 280/30 |
| 4,729,572 | * | 3/1988 | Bergeron ........................... 280/47.4 |
| 4,768,795 | * | 9/1988 | Mar ...................................... 280/30 |
| 4,861,105 | * | 8/1989 | Merten et al. .................... 297/250.1 |
| 5,056,865 | * | 10/1991 | Sedlack ............................ 297/250.1 |
| 5,076,599 | * | 12/1991 | Lockett et al. . | |
| 5,146,656 | * | 9/1992 | Huang . | |
| 5,322,343 | * | 6/1994 | Parker et al. . | |
| 5,676,386 | * | 10/1997 | Huang .................................. 280/30 |
| 5,727,798 | * | 3/1998 | Walters et al. ........................ 280/30 |
| 5,820,144 | * | 10/1998 | Wang ................................ 280/47.38 |
| 5,887,889 | * | 3/1999 | Andrus ................................. 280/647 |

FOREIGN PATENT DOCUMENTS

| | | | |
|---|---|---|---|
| 4031718 | * | 4/1992 | (DE) . |
| 2137084 | * | 10/1984 | (GB) . |

* cited by examiner

*Primary Examiner*—Brian L. Johnson
*Assistant Examiner*—Bryan Fischmann
(74) *Attorney, Agent, or Firm*—William E. Noonan

(57) ABSTRACT

A baby stroller apparatus used in combination with a standard child's car seat. The car seat includes a transportable base having at least one transverse slot and a latching mechanism mounted retractably within the slot and releasably interengagable with a locking component in a standard fixed base mounted in a motor vehicle. The stroller includes a frame having a pair of elongate, generally parallel side sections and at least one pair of elongate, generally parallel crossbar members that transversely and rigidly interconnect the side sections. The crossbar members in each pair include an upper crossbar member that is interengaged by the transverse slot in the transportable base of the car seat and is releasably interengaged with the latching mechanism. A lower crossbar member is interengaged by the transportable base such that the baby's car seat is supported on and releasably locked to the frame. A plurality of wheels are rotatably mounted to and depend from the frame and are engaged with the ground or a like surface for allowing the stroller to be driven by applying a pushing or pulling force to the frame.

19 Claims, 8 Drawing Sheets

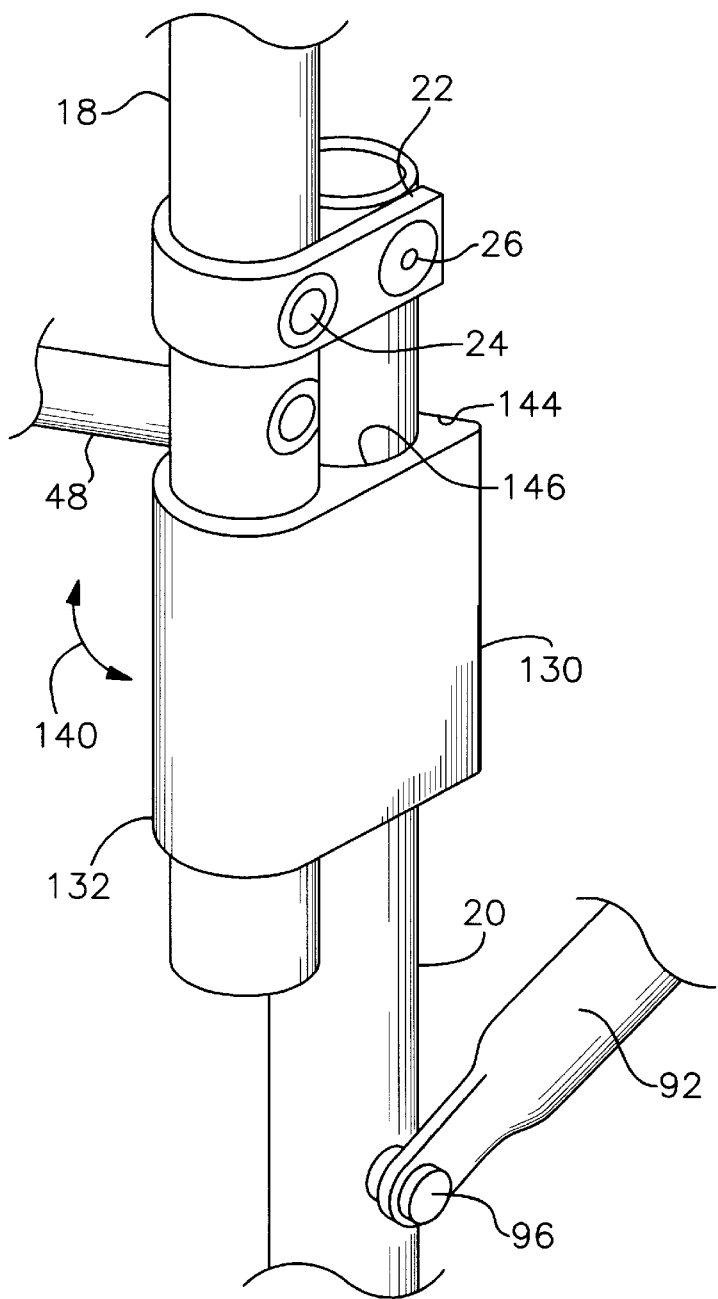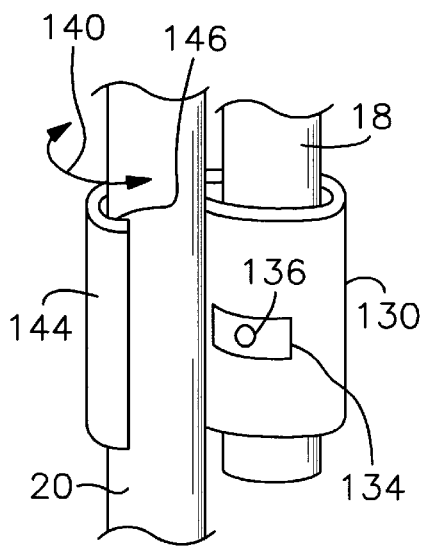
Fig. 6
Fig. 7

BABY STROLLER APPARATUS FOR USE IN COMBINATION WITH A STANDARD CHILD'S CAR SEAT

FIELD OF THE INVENTION

This invention relates to a baby stroller apparatus and, more particularly, a stroller frame that accommodates one or more standard car seats of the type used by infants, babies and small children.

BACKGROUND OF THE INVENTION

A wide variety of baby strollers are currently available. Virtually all of these employ a seat that is permanently fixed to the stroller frame. Such strollers are particularly inconvenient for transferring a child to or from a baby's car seat in an automobile or other motor vehicle. The child must be first unharnessed and lifted out of the stroller, and then reseated and rebuckled in the car seat. This entire procedure is reversed when the child is transferred from the car seat to the stroller. In either event, this task is normally awkward, time consuming and aggravating. The child is likely to be woken, or otherwise disturbed. Fussing and/or crying may result, which can be especially aggravating to the adult. There is also a risk of dropping the child when he or she is lifted. If the child is being returned from a visit to the supermarket or other store, an inefficient number of trips back and forth between the house and the vehicle may be required to unload the child and the purchased items. While at the store, the child typically must be transferred to a standard shopping cart. Known strollers do not provide substantial storage capability for items that are purchased.

Most conventional strollers also feature rather small wheels, which are not easily maneuverable. As a result, such strollers are very difficult, if not impossible, to push over sand, grass or other rough terrain.

Moreover, existing strollers do not adequately address the needs of newborn, premature and/or handicapped infants. Such babies typically require extra support for their heads and necks. They also require an especially secure harness arrangement. Most standard baby strollers simply do not provide these benefits. They are therefore impractical for use by very small infants.

A particular need exists for an improved multiple child stroller. Conventional strollers for twins normally feature a large, unwieldy and rather complicated construction. Multiple strollers that seat the children side-by-side are inordinately wide. They are usually difficult to maneuver in close quarters such as store aisles, restrooms, narrow sidewalks and elsewhere. Furthermore, virtually all multiple strollers exhibit one or more of the other problems described above.

SUMMARY OF THE INVENTION

It is therefore an object of this invention to provide an improved baby stroller apparatus that accommodates one or more standard children's car seats.

It is a further object of this invention to provide a baby stroller that permits a child to be installed in the stroller in a quick and convenient manner.

It is a further object of this invention to provide a baby stroller that permits a child to be readily transferred between the stroller and a motor vehicle without unduly disturbing the child and without having to undergo the aggravation and hassle of unbuckling, lifting, reseating and rebuckling the child.

It is a further object of this invention to provide a baby stroller that significantly improves the versatility and efficiency of the standard child's car seat.

It is a further object of this invention to provide a baby stroller that conveniently stores and transports items purchased at a store and greatly facilitates unloading a vehicle following a shopping trip.

It is a further object of this invention to provide a baby stroller that features a durable and lightweight construction as well as an aesthetically attractive appearance.

It is a further object of this invention to provide a baby stroller that utilizes large, easily maneuverable wheels and a lightweight frame so that the stroller may be pushed conveniently over grass, sand and virtually all types of rough terrain.

It is a further object of this invention to provide a baby stroller that permits a small child, his or her car seat, diaper bags and other accessories to be transported conveniently from the house to a motor vehicle and vice versa in a single trip.

It is a further object of this invention to provide a baby stroller that employs a sleek frame that permits a plurality of babies to be pushed conveniently through narrow or crowded areas such as store aisles, sidewalks, restrooms and elsewhere.

It is a further object of this invention to provide a baby stroller that is readily collapsible so that it may be conveniently transported in a motor vehicle or stowed at home.

It is a further object of this invention to provide a baby stroller for twins and other multiple numbers of children that supports the babies vertically with respect to one another such that the stroller is conveniently maneuverable and the babies' observation positions can be readily adjusted when desired.

It is a further object of this invention to provide a baby stroller that provides improved support and harnessing, especially for newborn, premature, disabled and/or under developed children.

It is a further object of this invention to provide a baby stroller that is easy to maintain and clean.

This invention results from a realization that infants and small children may be transported much more efficiently and conveniently, and with considerably less disturbance and aggravation by employing a stroller that uses, as its seat, a standard child's car seat, which may be quickly and easily attached to and removed from the stroller frame. This apparatus allows the baby to be pushed in the stroller simply by seating the child in the seat and mounting the car seat to the stroller frame. Then, when strolling is completed, the child may be quickly and conveniently removed from the stroller by disengaging and lifting the car seat from the frame. The car seat may then be carried manually or re-installed in a motor vehicle. There is no need to unbuckle the child from the stroller, lift the child, reseat the child in the car seat and re-harness the child. As a result, time is saved and considerable aggravation is avoided.

This invention features a baby stroller apparatus for use in combination with a standard child's car seat. The car seat includes a transportable base having a transverse slot formed therein. The transportable base also includes a latching mechanism mounted therein and extending across the transverse slot for releasably engaging a complementary locking component in a fixed car seat base mounted in a motor vehicle. The stroller includes a frame having a pair of elongate, generally parallel side sections and at least one pair of elongate, generally parallel crossbar members that transversely interconnect the side sections. One of the crossbar members is received by the transverse slot and releasably interengaged with the releasable latching mechanism. The other crossbar member interengages the transportable base such that the car seat is mounted on the frame. Wheel means are mounted rotatably to and depend from the frame for engaging the ground, the floor or a like surface and allowing the stroller to be pushed by applying a pushing or pulling force to the frame.

In a preferred embodiment, the frame includes a handle attached to at least one of the side sections proximate an upper end thereof. The handle may be transversely interconnected between respective upper ends of the side sections. Each side section may include a pair of foldably connected upper and lower segments, which are alternatable between an open condition and a collapsed condition. Clip means may be attached to one of the upper and lower side segments for selectively engaging the other of the upper and lower segments when the upper and lower segments are opened to hold the segments in the open condition. The clip means are selectively disengaged from the other segment to permit the interconnected segments to fold relative to one another.

An additional pair of the crossbar members may be selectively interengaged by the transverse slot and base of a second standard car seat such that a pair of car seats may be mounted on the stroller. Alternatively, the apparatus may feature a single pair of crossbars only. The crossbars may include elongate rods that are rigidly fixed to each of the opposing side sections.

The wheel means may include a forward wheel disposed between the side sections of the frame and connected rotatably to each side section proximate a lower end thereof. The frame preferably includes a subframe assembly collapsibly mounted to the side sections. The wheel means may include a pair of rearward wheels rotatably supported by the subframe. The subframe assembly may include a pair of elongate depending portions that are pivotably connected, respectively, to the upper segments of the side section. Each rear wheel is attached rotatably to the subframe proximate a lower end of a respective depending portion. The subframe assembly may further include a pair of support arms. Each support arm may be pivotably connected proximate a first end to the lower segments of a respective side section and pivotably connected proximate an opposite second end to the upper segment of the respective side section. The subframe may include a transverse lower element that interconnects the depending portions proximate lower ends thereof such that the depending portions and the transverse element define a generally U-shaped configuration. The subframe may also include a transverse upper element that interconnects the depending portions above the transverse lower element. Folding the upper side segments relative to the lower side segments causes the depending portions and the support arms to fold into a collapsed condition. Unfolding the upper segments relative to the lower segments causes the depending portions and the support arms to open and support the frame in a longitudinally tilted condition.

A fender component may be attached to the frame and held at least partly over the forward wheel. A storage container may be connected to the fender and the subframe. The stroller may also be interengaged by standard transportable car seat bases that do not include a latching mechanism.

BRIEF DESCRIPTION OF THE DRAWINGS

Other objects, features and advantages will occur from the following description of a preferred embodiment and the accompanying drawings, in which:

FIG. 6 is a perspective view illustrating the manner in which the upper and lower segments of the side section of the frame are pivotably interconnected and releasably locked in an open condition;

FIG. 7 is a perspective view of the locking clip, as viewed from inside the frame (the direction opposite that illustrated in FIG. 6);

Figure 1:
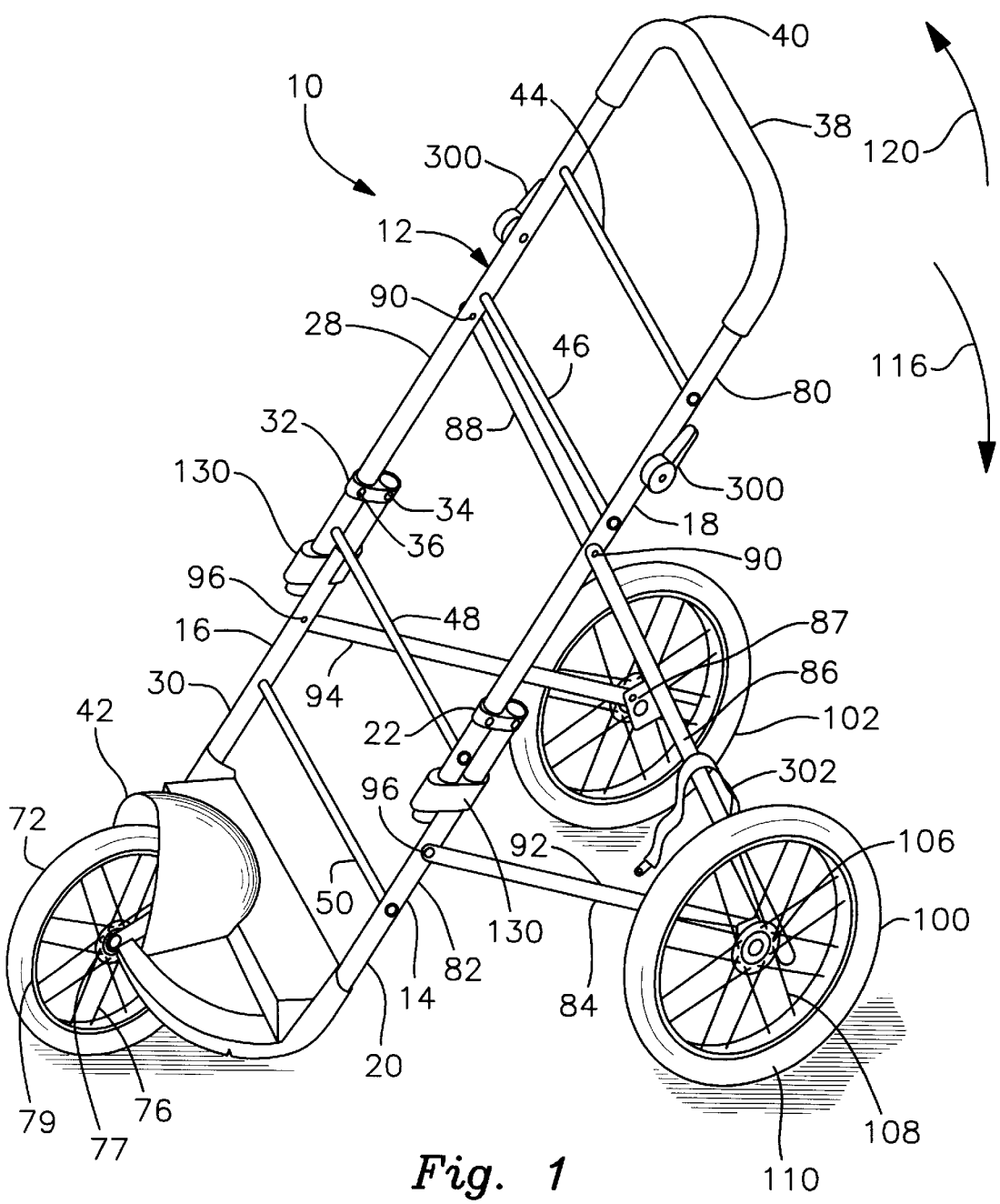
FIG. 1 is a perspective view of a stroller apparatus according to the invention; the stroller is open and ready for use with a pair of standard infant car seats in accordance with this invention.
Figure 2:
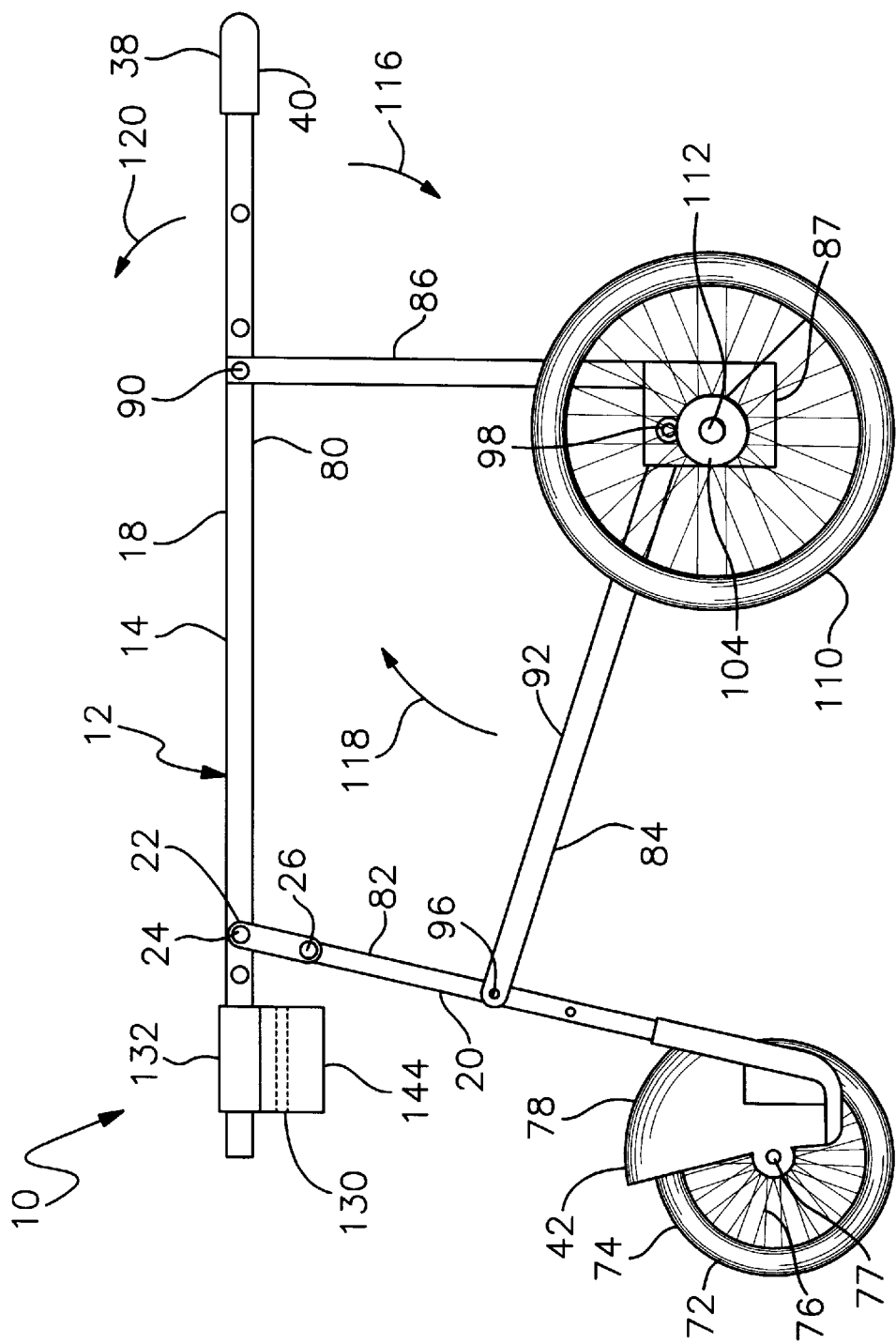
FIG. 2 is an elevational side view of the apparatus in a partially collapsed condition.
Figure 3:
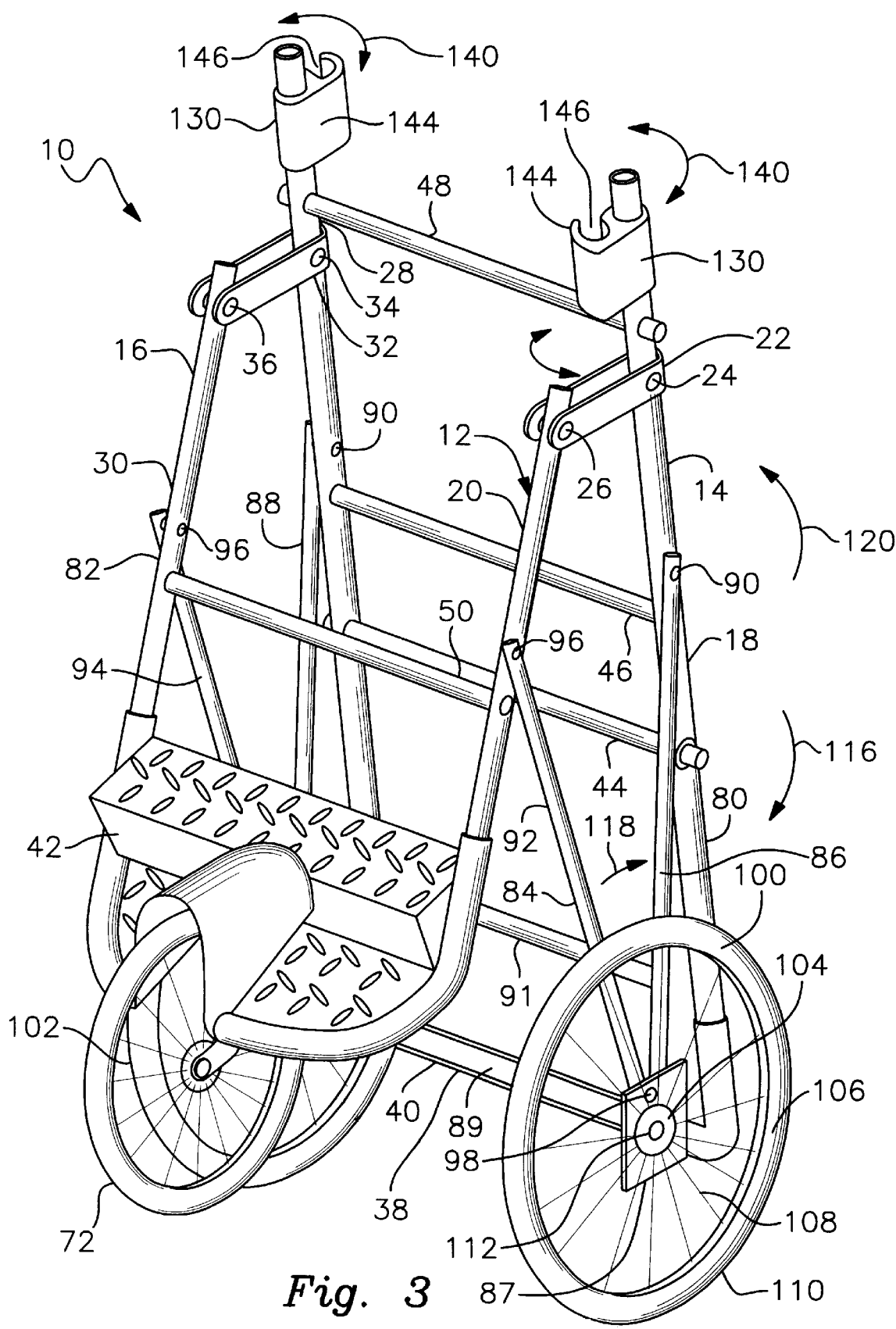
FIG. 3 is a perspective view of the apparatus in a fully collapsed condition.

There is shown in FIGS. 1–3 a baby stroller apparatus 10 that is designed for use in combination with a standard child's (e.g. baby's, infant's or toddler's) car seat in a manner that is described more fully below. In the embodiment described herein, the stroller is designed for use with a pair of car seats. However, it should be noted that in alternative embodiments, a stroller according to this invention may be constructed for use with a single car seat, or even more than two car seats. Inventive principals similar to those described herein will apply to all such versions.

Stroller 10 includes a generally tubular frame 12. Each of the components in frame 12, which are described more fully below, preferably comprise a durable metal or metal alloy tubing. Various forms of plastic and fiberglass may also be used within the scope of this invention. One inch tubing is a preferred dimension; however, other diameters may be employed. As best shown in FIG. 1, frame 12 comprises a pair of elongate, generally parallel side sections 14 and 16. Side section 14 includes a tubular upper segment 18 and a tubular lower segment 20 that is pivotably or foldably connected to segment 18 by a generally U-shaped bracket 22. Bracket 22 is wrapped about and fixedly connected to segment 18 by a pin 24. FIGS. 2 and 3. Segment 20 extends through and is pivotably connected to bracket 22 by a second pin 26. The opposite side section 16 includes a similar pair of upper and lower segments 28 and 30, respectively. (See FIGS. 1 and 3) These segments are pivotably interconnected by a second U-shaped bracket 32 that is wrapped about upper segment 28 and fixed thereto by a pin 34. Lower segment 30 extends through bracket 32 and is hingedly connected thereto by a pivot pin 36.

The respective upper ends of side sections 14 and 16 (and, more particularly, the upper ends of upper segments 18 and 28) are interconnected by a handle 38, which extends transversely between upper segments 18 and 28. Typically, the handle comprises a piece of tubing (obscured in the drawings) that is connected unitarily, by welding or otherwise, to the upper ends of each of segments 18 and 28. Handle 38 further includes a generally cylindrical padded sleeve 40 that is disposed about the transverse metal tubing. The ends of padded sleeve 40 extend partially along the side segments 18 and 28 such that a comfortable padded handle is provided at the upper end of the frame. The padded sleeve may be composed of foam or other materials that provide a secure, yet comfortable grip. Various other types of handles may be attached to the upper ends of one or both of side sections 14 and 16.

A plastic or metal fender 42 is attached to lower side segments 20 and 30 such that the lower ends of the side segments are obscured in FIGS. 1–3. The particular construction of the lower ends of the lower side segments and the manner in which fender 42 is connected to those sections is described in greater detail below.

Figure 4:
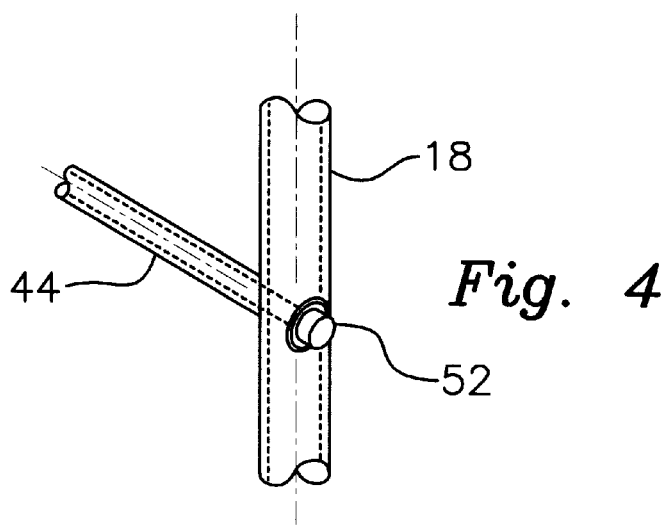
FIG. 4 is a perspective view illustrating the manner in which a representative one of the crossbar members is interconnected to a side section of the frame.

A first, upper pair of parallel crossbar members 44 and 46 transversely interconnect side sections 14 and 16 and, more particularly, upper segments 18 and 28. A second lower pair of parallel crossbar members 48 and 50 interconnect side sections 14 and 16 below members 44 and 46. More specifically, crossbar member 48 interconnects upper segments 18 and 28 proximate the respective lower ends of those segments; member 50 similarly transversely interconnects lower segments 20 and 30 a short distance above fender 42. Each of the crossbar members 44, 46, 48 and 50 is rigidly interconnected at each of its ends to a respective tubular segment in the manner represented by member 44 in FIG. 4. Each crossbar member comprises an elongate rod or bar. For example, the crossbar members may include steel rods having a diameter of about ⅜". Plastic or fiberglass sleeves may be mounted about each of the rods. Various alternative compositions and dimensions may also be utilized. As represented by member 44, each crossbar member is attached at each of its ends to a respective tubular side segment (e.g. segment 18) by a ⅜" self-locking cap nut 52. It should be understood that various other means of attachment may be used (i.e. welding) for securing the crossbar members either permanently or releasably to the frame. Members, 44, 46, 48 and 50 are spaced apart along the frame in such a manner that they are interengaged by a pair of standard car seats in the manner shown and described below. In certain versions, the crossbars may be adjustable along the frame to vary the angle at which the seat is held.

Figure 5:
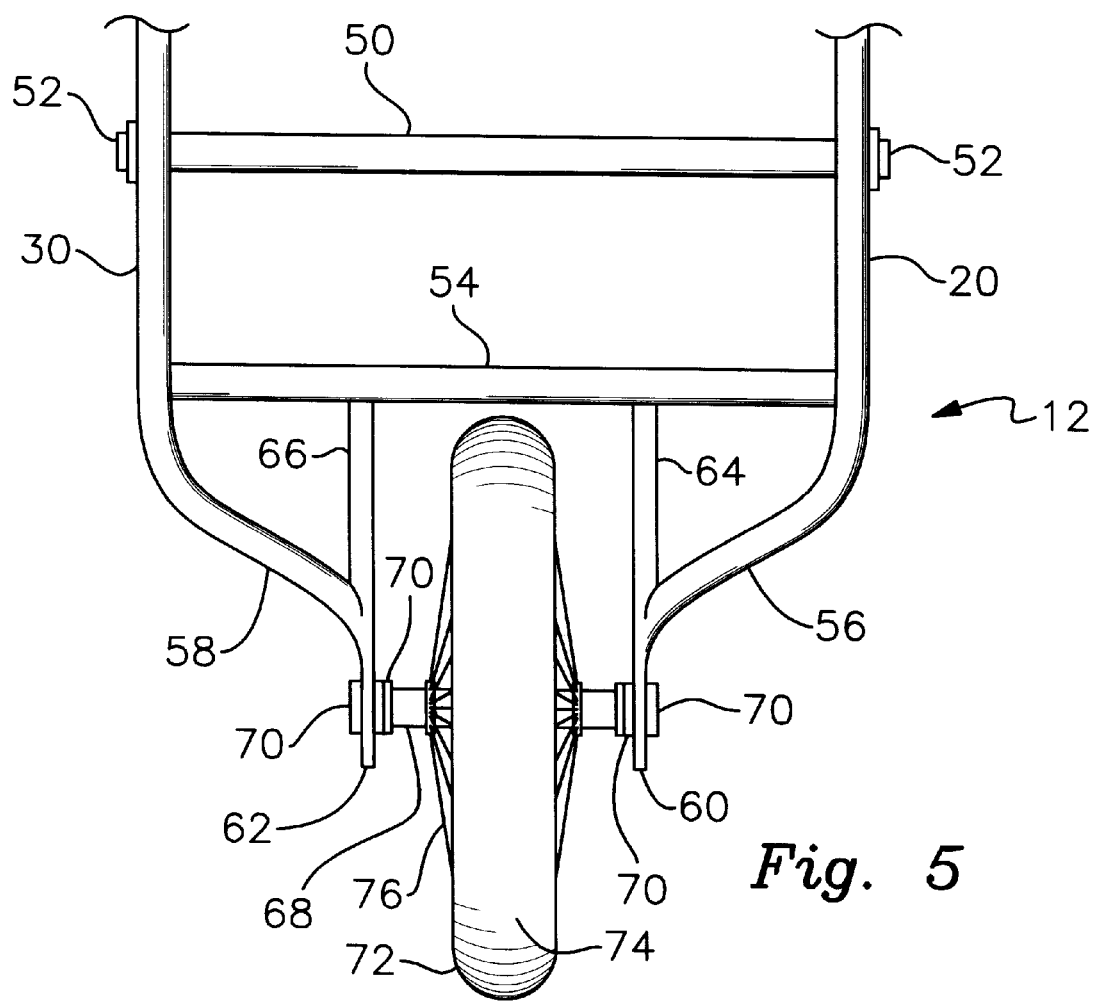
FIG. 5 is a front elevational view of the lower end of the frame and the forward wheel; the fender is removed for clarity.

The lower end of frame 12 is illustrated in FIG. 5. Therein the previously referenced fender 42 is removed for clarity. Lower segments 20 and 30 are interconnected by lowermost crossbar 50, which is secured to segments 20 and 30 by respective cap nuts 52. A lateral frame element 54 interconnects and is welded to each of segments 20 and 30. The lower ends 56 and 58 of segments 20 and 30, respectively, are bent inwardly and include respective wheel mounting flanges 60 and 62. Elongate reinforcing struts 64 and 66 interconnect lower ends 56 and 58 and lateral element 54. Once again, struts 64 and 66 are welded between the respective components to which they are attached. An axle or spindle 68 is interconnected between flanges 60 and 62, and secured in place by appropriate mounting nuts 70. A forward wheel 72 is rotatably mounted on the axle. Wheel 72 includes a tire 74 and spokes 76, which interconnect a standard hub 77 and a rim 79. (FIG. 1) Various alternative types of forward wheels may be employed at the lower end of frame 12. The particular wheel construction is not a limitation of this invention. Preferably, a durable and relatively large diameter wheel is employed so that the stroller is easily maneuverable over various types of rough terrain.

Fender 42, FIGS. 1–3, preferably comprises a molded plastic that contains grooves or channels that permit it to be snap fit onto segments 20 and 30 of frame 12. Bolts, screws and other forms of attachment (not shown) may also be used to securely fasten the fender to the frame. Fender 42 includes a cowl portion 78 that extends and at least partially covers the forward wheel. Cowl portion 78 protects children mounted in the stroller from splashing or spray generated by wheel 72 when the stroller is pushed over a wet surface.

The upper side segments 18 and 28 of frame 12 define an upper frame portion 80, FIGS. 1–3, and the lower side segments 20 and 30 define a lower frame portion 82. These frame portions 80 and 82 are pivotably interconnected by the previously described brackets 22 and 32 and pivots 26 and 36. As a result, lower frame portion 82 is able to pivot back and forth relative to upper frame portion 80 between the open condition shown in FIG. 1 and the collapsed condition shown in FIG. 3. FIG. 2 depicts the stroller in an intermediate, partially folded condition.

As shown in FIGS. 1–3, frame 12 also includes a subframe assembly 84 that is collapsibly mounted to side sections 14 and 16. More particularly, subframe assembly 84 includes a pair of generally tubular, elongate depending members 86 and 88 that are pivotably interconnected to upper side segments 18 and 28, respectively, by appropriate pins 90 or other pivot means. A lower portion of each of the depending members 86 and 88 is welded or otherwise permanently secured to a mounting bracket 87, best shown in FIG. 2. The lowermost ends of depending members 86, 88 are themselves interconnected by a transverse lower element 89, FIG. 3, that unitarily interconnects the depending members. The depending members 86, 88 and the interconnecting transverse lower element 89 thereby feature a generally U-shaped configuration. An upper transverse element 91 further interconnects members 86 and 88, thus strengthening the subframe. Transverse element 91 is welded or otherwise permanently secured between the depending members.

The subframe further includes a pair of elongate, generally tubular support arms 92 and 94. As shown in FIGS. 1–3, the forward end of each of arms 92 and 94 is pivotably connected to a respective one of the lower side segments 20 and 30 by a pivot pin 96. The rearward end of each of the support arms 92, 94 is likewise pivotably connected to a respective one of the brackets 87 by a pivot pin 98. (FIGS. 2 and 3) The components of subframe assembly 84 typically comprise metal tubing or other material analogous to that employed by the remainder of frame 12. The end of the tubular components may carry respective flanges to facilitate interconnection of the components.

A pair of rearward wheels 100 and 102 are rotatably mounted to subframe assembly 84. More particularly, each wheel is rotatably connected to a respective one of the mounting brackets 87. Each of the rearward wheels 100 and 102 features a construction that is similar to forward wheel 72. For example, each rearward wheel may include a central hub 104 and a circumferential rim 106, which are interconnected by a plurality of radial spokes 108. A tire 110 is mounted on rim 106. Hub 104 is supported on a shaft or axle 112. The axle is itself rotatably mounted to a respective one of the mounting brackets 87 (which are themselves attached fixedly to depending members 86, 88 and pivotably to support arms 92, 94, respectively). The rearward wheels 100 and 102 and axles further include appropriate bearings, nuts and washers, which permit them to be rotatably mounted to their respective mounting brackets. The particular structure used to rotatably mount the rearward wheels to the subframe is again not a limitation of this invention. Various alternative means may be used. As shown in FIGS. 1–3, the rearward wheels preferably have a diameter that is somewhat greater than that of the forward wheel 72. This improves maneuverability of stroller 12 and facilitates pushing, pulling or otherwise driving the stroller over sand, grass and rough terrain. The lightweight tubular construction of the frame and subframe makes this operation even easier. Wheels that employ tires are particularly preferable over standard plastic or otherwise unitarily constructed stroller wheels. The relatively small, unitary wheels employed by strollers of the prior art tend to cause those devices to be difficult to maneuver in rough terrain. The apparatus may employ various types of quick release wheels.

As with the side sections 14 and 16 of frame 12, the subassembly 84 is selectively folded and unfolded by alternately collapsing and opening the upper frame portion 80 relative to the lower frame portion 82. In particular, as shown in FIGS. 1–3, when upper portion 80 is pivoted downwardly relative to lower portion 82, in the direction of arrow 116, the support arms 92, 94 and depending members 86, 88 pivot toward one another as indicated by arrow 118. In the collapsed condition shown in FIG. 3, the angle between the depending portions 86, 88 and the support arms 92, 94 is at its smallest. In this condition, the stroller features a relatively flattened configuration which is suitable for convenient transportation and storage. The lower frame portion 82 is drawn inwardly against the upper frame portion 80. Forward wheel 72 is raised above the ground or floor. In the fully collapsed condition, handle 38 engages the ground or floor and the stroller can be balanced on the handle and rearward wheels 100 and 102. Alternately, when the stroller is opened, upper frame portion 80 and lower frame portion 82 are hingedly opened relative to one another, as depicted by arrow 120, from the condition shown in FIG. 3 through the state shown in FIG. 2 and into the fully open condition depicted in FIG. 1. In the latter condition, all three of the wheels 72, 100 and 102 engage the ground and frame 12 is supported such that side sections 14 and 16 tilt upwardly from the front wheel to the rear wheels.

In the open condition, the upper and lower portions 80 and 82 are substantially aligned. More particularly, upper segments 18 and 28 are orientated relative to respective lower segments 20 and 30 in the manner best depicted in FIGS. 6 and 7. Therein, the upper and lower segments 18 and 20 of side section 14 are illustrated. An analogous construction is employed for the segments of opposite side section 16. When the stroller is fully opened and operable, the lower end of each upper side segment overlaps the upper end of its associated lower segment. Although the upper and lower segments are not in perfect alignment, they are generally axially aligned (or at least axially parallel to one another).

A clip 130 (also shown in FIGS. 1–3) is used to releasably lock the respective upper and lower segments in the open, unfolded condition. In FIGS. 6 and 7, clip 130 is shown interengaging upper and lower segments 18 and 20. A second clip 130 is similarly used for interconnecting upper and lower segments 28 and 30 as shown in FIGS. 1–3. In each case, clip 130 comprises a molded plastic element that is wrapped about and secured to a respective upper side segment 18, 28. The clip is releasably interengagable with and selectively clipped to a respective lower side segment 20, 30. As best shown in FIGS. 6 and 7, clip 130 includes a first, tubular portion 132 that fits snuggly over the lower end of the upper side segment (i.e. representative segment 80). Tubular portion 132 includes a circumferential slot 134, FIG. 7, which receives the head of a screw or bolt 136 mounted in segment 18. This holds clip 130 onto segment 18 and permits the clip to rotate to a limited degree about the upper side segment as indicated by doubleheaded arrows 140 in FIGS. 3, 6 and 7. Clip 130 also includes a clamp 144, that extends unitarily from tubular portion 132 as shown in FIGS. 2, 3, 6 and 7. Clamp 144 extends from section 132 and forms a generally cylindrical recess or pocket 146. The pocket has a diameter that is approximately equal to the diameter of lower side segment 20. When the side segments are in the straightened condition shown in FIGS. 1, 6 and 7, clips 130 are swiveled about the respective upper segments 18 and 20 and the clamp 144 of each clip is flexed open so that it can be snapped onto a respective one of the lower side segments 20 and 30. Each lower side segment is inserted (snap fit) into a respective pocket 146. The resilience of the clip urges the clamp into snug interengagement with the lower side segment. As a result, the clip holds the aligned side segments in the open or unfolded condition shown in FIG. 1. Stroller 10 is then used to push a baby in a manner that will be described below. Subsequently, when the stroller is not in use, it can be collapsed by again flexing clamps 144 and expanding pockets 146. This permits the clips 130 to be swiveled about their respective upper segments 18 and 28 and disengaged from the lower segments 20 and 30. See FIG. 3. When the clips 130 are disengaged from the lower side segments in this fashion, the lower portion 82 of frame 12 is allowed to pivot into the folded or collapsed condition shown in FIG. 3. Clips 130 thereby permit the frame to be locked into the open condition when desired but are easily released to permit the stroller to be folded when not in use.

Figure 8:
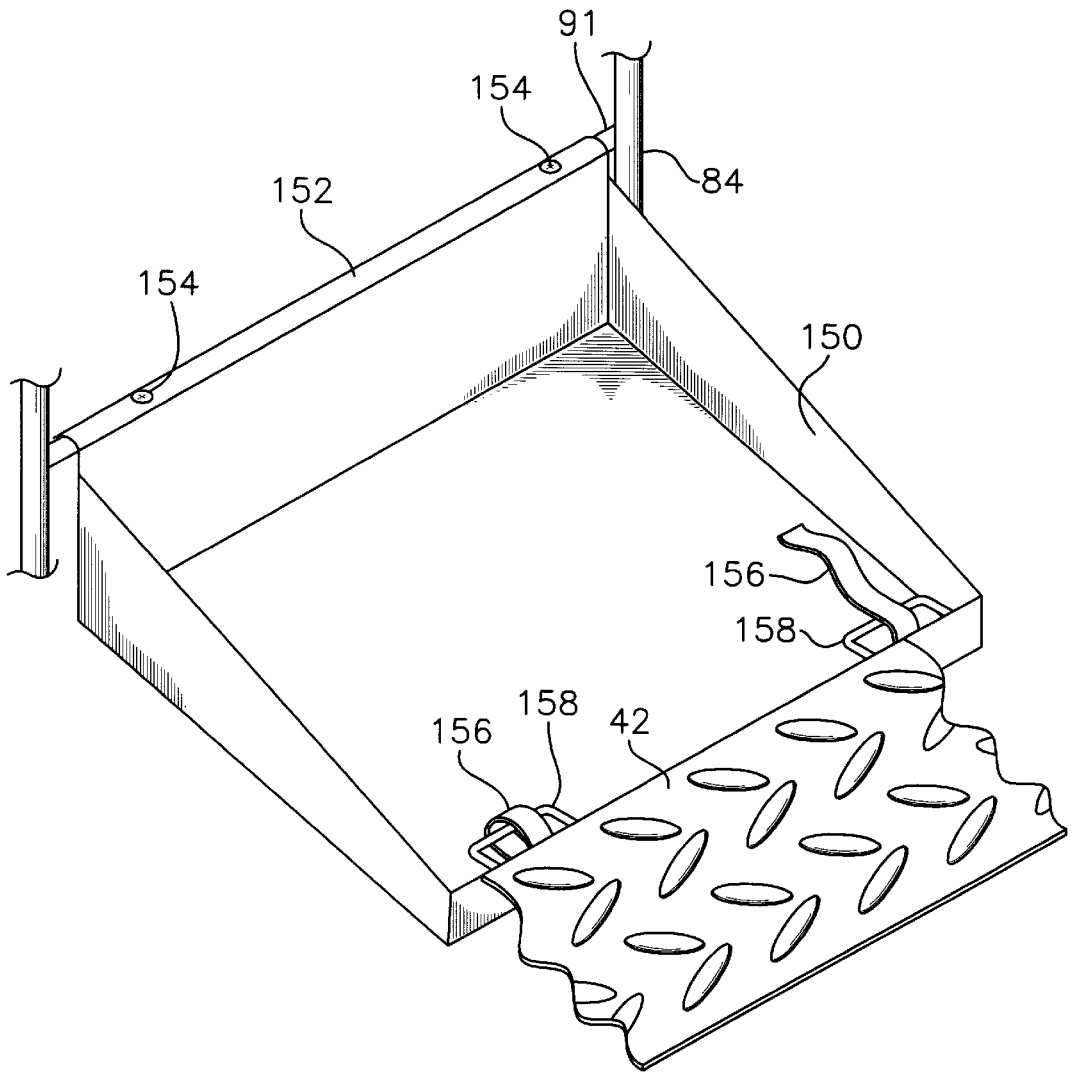
FIG. 8 is a perspective view of an optional storage container which may be mounted to the stroller.

As shown in FIG. 8, as optional storage container 150 may be mounted to frame 12. In particular, container 150 may be composed of a fabric, canvass, plastic or other suitable material. The rearward end of container 150 includes a flap 152 having a plurality of grommets 154. The grommets are aligned with corresponding holes formed in upper transverse element 91 of subframe 84. Bolts, screws, rivets or other suitable attachments means are installed through the grommets and corresponding aligned holes in element 91 to secure flap 152 in place. The forward end of container 150 includes a pair of straps 156. Each of these straps includes a complementary pair of Velcro® components that permit the straps to be releasably secured to themselves. A pair of retainer slots 158 are carried by the rearward end of fender 42. Each strap 156 is inserted through a corresponding retainer slot 158 and the Velcro® components are interengaged to secure the forward end of container 152 to fender 42. This container permits the user to conveniently store baby items and/or other articles being transported (e.g. groceries and the like) within the stroller. This reduces the number of trips the user must make between the house and vehicle. It also permits, in some cases, the stroller to be used for shopping instead of a standard shopping cart. As a result, the child does not have to be moved into and out of a shopping cart.

Figure 9:
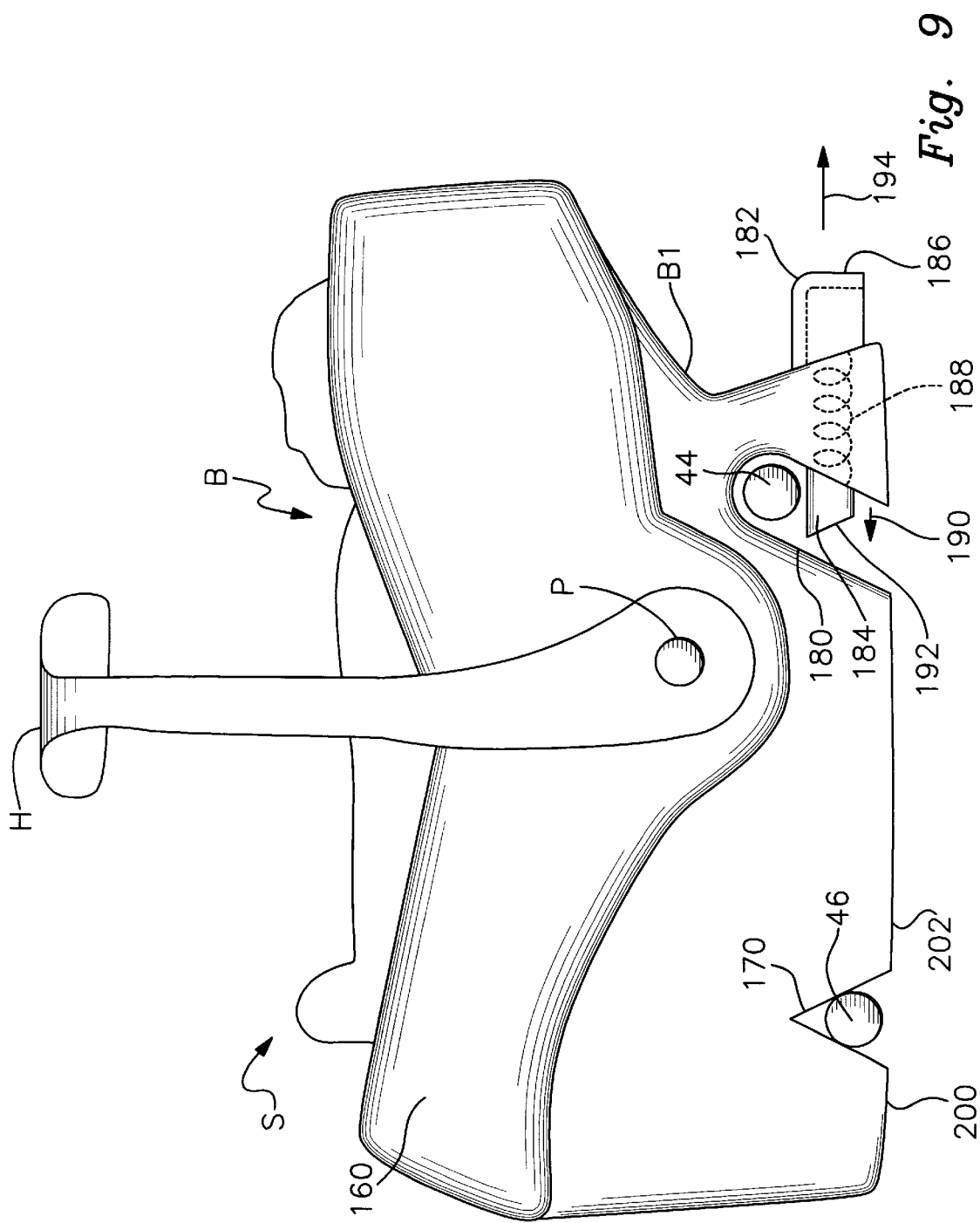
FIG. 9 is an elevational side view of a standard child's car seat mounted to a representative pair of the crossbar members such that the car seat is releasably mounted to the stroller apparatus.
Figure 10:
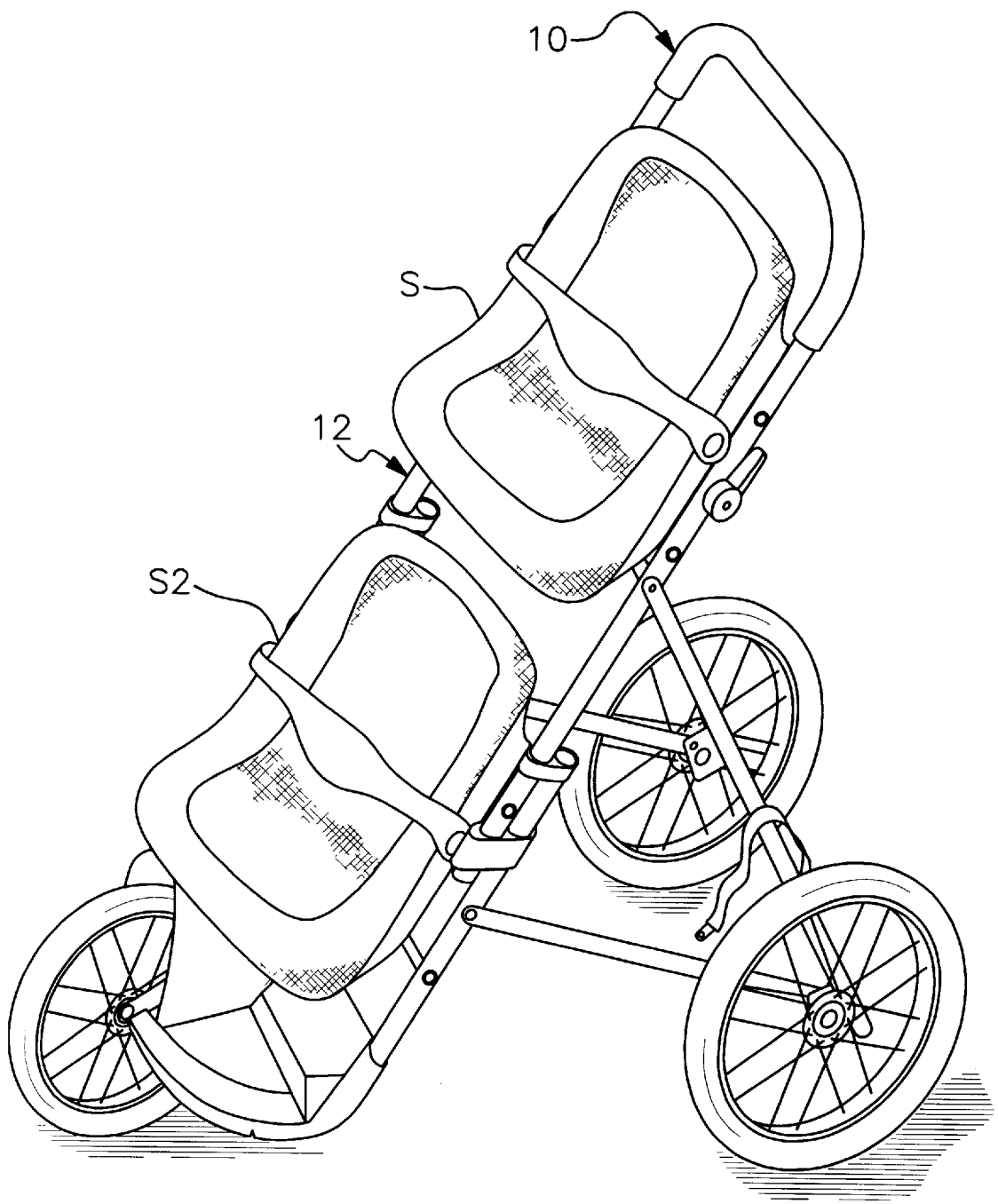
FIG. 10 is a perspective view of the fully assembled stroller with a pair of standard child's car seats mounted releasably thereon.

A pair of standard infant car seats are mounted to the stroller in the manner shown in FIGS. 9 and 10. A conventional baby's car seat is depicted in FIG. 9. This apparatus may comprise a seat such as of the type manufactured by Evenflo® or the like. The seat S includes a padded upper section 160 in which the baby B is placed. A three-point harness, not shown, holds the baby securely in place within upper section 160. A handle H is mounted by a pivot P to seat S. The seat includes a transportable plastic base B1. The lower surface or bottom edge of the transportable base includes means defining pair of forward and rearward transverse slots or recesses. In particular, forward slot 170 typically comprises a pair of generally aligned, V-shaped notches. The rearward slot 180 comprises a pair of generally axially aligned, deeper U-shaped grooves. It should be understood that this invention is applicable with various known standard car seats, transportable bases and slot configurations. In some versions, car seats having only a single slot or recess may be employed. In the version depicted herein, transportable base B1 also includes a standard spring operated latching mechanism 182. The latching mechanism comprises a latch element 184 and a handle 186 that is connected to latch element 184. A spring 188 mounted within the base (and depicted schematically herein) urges latch element 184 forwardly in the direction of arrow 190 so that it normally extends across slot 180 and maintains the condition shown in FIG. 9. When used in a vehicle, the latch element releasably interengages a corresponding locking component in the standard fixed base of the car seat assembly. That fixed base is not shown herein, but is well known (as is the interengagement of the locking mechanism with the fixed base). Handle 186 permits latch element 184 to be retracted within the base so that the car seat can be disengaged from a conventional lower base, which is strapped in the motor vehicle.

To mount car seat S on stroller 10, slots 170 and 180 are aligned with a corresponding pair of crossbar members 44, 46 and 48, 50. In FIG. 9, for example, seat S is mounted on the upper pair of crossbar members 44 and 46. More particularly, slot 180 is aligned with crossbar member 44 and recess 170 is aligned with crossbar member 46. The crossbar members in each pair are spaced apart such that the distance corresponds to the distance between slots 170 and 180. The slots of seat S and its transportable base B1 are lowered onto and receive crossbar members 44 and 46 in the manner shown. Lower crossbar 46 simply fits within or engages recess 170. Uppermost crossbar 44 is received by slot 180 and engages the leading angled surface 192 of latch element 184. The weight of the car seat and baby B1 causes latch element 184 to retract within upper base B1 against spring 188. As a result, member 44 is inserted past element 184 into the innermost end of slot 180. After the crossbar member passes latch element 184, spring 188 urges the latch to re-extend across slot 180 in the direction of arrow 190. As a result, latch element 184 retains crossbar member 44 within slot 180 and effectively locks the car seat onto the stroller frame. To release seat S from the stroller 10, the user pulls handle 186 in direction of arrow 194. This retracts latch element 184 within the upper base B1 so that crossbar member 44 may be removed from slot 180. The car seat may then be simply lifted off of the stroller.

In FIG. 10, the stroller is in its fully opened and operating condition and seat S is shown mounted to frame 12 of stroller 10 in the manner just described. A second standard seat S2 (constructed identically to seat S) is similarly mounted to the stroller frame beneath seat S. In this case, the slots of the standard car seat, previously described, are engaged with the lower pair of crossbar members 48 and 50, shown in FIGS. 1–3. Seat S2 is engaged with and removed from the lower pair of crossbar members in a manner analogous to that shown and described in FIG. 9. With the seats engaged with the frame, the assembled stroller is driven by applying a pushing, pulling or other (i.e. pivoting or tilting) force to the frame.

An optional canopy holder may be mounted to frame 12 as shown in FIG. 1. The holder includes a pair of tubular members 300 that are pivotally connected to side sections 14 and 16 respectively. Likewise, a strap 302 may be attached to depending member 86. The strap is releasably engaged with wheel 100 to hold the stroller in a braked condition. Other types of brakes may also be used.

It should be understood that, in alternative versions of this invention, various other numbers of car seat supporting crossbar members may be employed. For example, the stroller may employ a single pair of crossbar members for supporting just one car seat. It should also be understood that the crossbar members of a particular pair may be spaced apart from one another such that one of the members (typically the lower member) does not precisely engage a slot or recess in the car seat (i.e. slot 170). Rather, the lower crossbar member may simply engage a bottom edge or surface of the transportable box base of the car seat (such as at various points 200 and 202, FIG. 9).

It should also be understood that various alternative arrangements may be employed for the frame, subframe assembly and wheel assembly. For example, four wheels may be utilized in certain versions. The frame and the subframe may employ various other structural components, including but not limited to braces, arms, struts, etc. As previously described, assorted types of wheel arrangements and wheel mounting systems may be used.

Accordingly, the stroller of this invention provides for a number of advantages. A standard child's car seat S may be conveniently transported to and from a motor vehicle within the stroller without having manually to carry the child in the seat. Moreover, the child may be transported back and forth between the stroller and the motor vehicle without having to perform tedious and time consuming buckling, lifting, reseating and re-harnessing tasks. The child is subject to much less disruption. The unique "double decker" construction of the stroller is ideal for twins. The children are transported conveniently on a relatively narrow frame that is easy to maneuver in narrow areas such as store aisles, restrooms and sidewalks. Alternative seating heights are provided for the children so that they are able to observe from different levels and are allowed to experience a variety of interesting strolling positions.

By allowing the standard child's car seat to serve as the seat of the stroller, improved support and secure harnessing is provided. This is especially important for newborns as well as premature and underdeveloped infants.

The stroller is aesthetically attractive. It is also easy to maintain and clean. Pushing the stroller over rough terrain is considerably easier than pushing a conventional twin stroller over such surfaces.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A baby stroller apparatus for use in combination with a child's car seat, which car seat includes a transportable base having a transverse slot formed therein and a latching mechanism mounted therein and extending across the transverse slot for releasably engaging a complementary locking component in a fixed car seat base, said stroller comprising:

a frame including a pair of elongate, generally parallel side sections and a pair of elongate, generally parallel crossbar members that transversely interconnect said side sections; one of said crossbar members being received by the transverse slot and releasably interengaged with the latching mechanism in the transportable base of the car seat and the other crossbar member being interengagable by the transportable base to mount the car seat on said frame, each said side section including a pair of foldably connected upper and lower segments, which are alternatable between an open condition and a collapsed condition; and wheel means mounted rotatably to and depending from said frame for engaging the ground or a like surface and allowing the stroller to be driven by applying a pushing or pulling force to said frame.

2. The apparatus of claim 1 in which said frame includes a handle attached to at least one of said side sections proximate an upper end thereof.

3. The apparatus of claim 2 in which said handle is transversely interconnected between respective upper ends of said side sections.

4. The apparatus of claim 1 further including clip means attached to one of said upper and lower segments for selectively engaging the other of said upper and lower segments when said upper and lower segments are open to hold said segments in said open condition, said clip means being selectively disengaged from said other segment to permit said interconnected segments to be fold relative to one another.

5. The apparatus of claim 1 in which said frame includes at least one additional pair of crossbar members, each said additional pair including an upper crossbar member that is receivable by the transverse slot and releasably interengaged with the latching mechanism in the transportable base of the standard car seat and a lower crossbar member that is engagable by the transportable base to support the car seat on said frame.

6. The apparatus of claim 1 in which said frame includes a subframe assembly collapsibly mounted to said side sections, said wheel means including a pair of rearward wheels rotatably supported by said subframe.

7. The apparatus of claim 6 in which said subframe assembly includes a pair of elongate depending portions that are pivotably connected, respectively, to said upper segments of said side sections, each said rear wheel being attached rotatably to said subframe proximate a lower end of a respective depending portion.

8. The apparatus of claim 7 in which said subframe assembly further includes a pair of support arms, each said arm being pivotably connected proximate a first end to said lower segment of a respective side section and pivotably connected proximate an opposite second end to said upper segment of said respective side section, whereby folding said upper segments relative to said lower segments causes said depending portions and said support arms to fold into a collapsed condition and unfolding said upper segments relative to said lower segments causes said depending portions and said support arms to open and support said frame in a longitudinally tilted condition.

9. The apparatus of claim 7 in which said subframe includes a transverse lower element that interconnects said depending portions proximate lower ends thereof, whereby said depending portions and said transverse element define a generally U-shaped configuration.

10. The apparatus of claim 9 in which said subframe includes a transverse upper element that interconnects said depending portions above said transverse lower element.

11. A baby stroller apparatus for use in combination with a child's car seat, which car seat includes a transportable base having transverse forward and rearward slots arranged substantially axially parallel to one another, said stroller comprising:

a frame including a pair of elongate, generally parallel side sections and at least one pair of elongate, generally parallel crossbar members that transversely and rigidly interconnect said side sections, said crossbar members being spaced apart from one another by a distance such that the forward and rearward slots of the baby's car seat are interengagable respectively with a corresponding pair of said crossbar members to support the car seat on said frame, said frame including a first, upper pair of said crossbar members, which are selectively interengaged by the slots of a first standard car seat and a second, lower pair of crossbar members, which are selectively interengaged by the slots of the second standard car seat, whereby a pair of standard car seats are mounted on the stroller; and wheel means mounted rotatably to and depending from said frame for engaging the ground or a like surface and allowing the stroller to be driven by applying a pushing or pulling force to said frame.

12. The apparatus of claim 11 in which each said side section includes a pair of foldably connected upper and lower segments, which are alternatable between an open condition and a collapsed condition.

13. A baby stroller apparatus for use in combination with a child's car seat, which car seat includes a transportable base having a transverse slot formed therein and a latching mechanism mounted therein and extending across the transverse slot for releasably engaging a complementary locking component in a fixed car seat base, said stroller comprising:

a frame including a pair of elongate, generally parallel side sections and a pair of elongate, generally parallel crossbar members that transversely interconnect said side sections; one of said crossbar members being received by the transverse slot and releasably interengaged with the latching mechanism in the transportable base of the car seat and the other crossbar member being interengagable by the transportable base to mount the car seat on said frame, said frame including at least one additional pair of crossbar members, each said additional pair including an upper crossbar member that is receivable by the transverse slot and releasably interengaged with the latching mechanism in the transportable base of the standard car seat and a lower crossbar member that is engagable by the transportable base to support the car seat on said frame; and wheel means mounted rotatably to and depending from said frame for engaging the ground or a like surface and allowing the stroller to be driven by applying a pushing or pulling force to said frame.

14. If The apparatus of claim 13 in which said wheel means include a forward wheel disposed between said side sections of said frame and connected rotatably to each said side section proximate a lower end thereof.

15. A baby stroller apparatus for use in combination with a child's car seat, which car seat includes a transportable base having a transverse slot formed therein and a latching mechanism mounted therein and extending across the transverse slot for releasably engaging a complementary locking component in a fixed car seat base, said stroller comprising:

a frame including a pair of elongate, generally parallel side sections and a pair of elongate, generally parallel crossbar members that transversely interconnect said side sections; one of said crossbar members being received by the transverse slot and releasably interengaged with the latching mechanism in the transportable base of the car seat and the other crossbar member being interengagable by the transportable base to mount the car seat on said frame; and wheel means mounted rotatably to and depending from said frame for engaging the ground or a like surface and allowing the stroller to be driven by applying a pushing or pulling force to said frame, said wheel means including a forward wheel disposed between said side sections of said frame and connected rotatably to each said side section proximate a lower end thereof.

16. The apparatus of claim 15 further including a fender component attached to said frame and held at least partly over said forward wheel.

17. The apparatus of claim 16 further including a storage container connected to said fender and said subframe.

18. A baby stroller apparatus for use in combination with a child's car seat, which car seat includes a transportable base having transverse forward and rearward slots arranged substantially axially parallel to one another, said stroller comprising:

a frame including a pair of elongate, generally parallel side sections and at least one pair of elongate, generally parallel crossbar members that transversely and rigidly interconnect said side sections, said crossbar members being spaced apart from one another by a distance such that the forward and rearward slots of the baby's car seat are interengagable respectively with a corresponding pair of said crossbar members to support the car seat on said frame, each said side section including a pair of foldably connected upper and lower segments, which are alternatable between an open condition and a collapsed condition; and wheel means mounted rotatably to and depending from said frame for engaging the ground, or a like surface, and allowing the stroller to be driven by applying a pushing or pulling force to said frame.

19. The apparatus of claim 18 further including clip means attached to one of said upper and lower segments for selectively engaging the other of said upper and lower segments when said upper and lower segments are open to hold such segments in said open condition, said clip means being selectively disengaged from said other segment to permit said interconnected segments to fold relative to one another.

* * * * *